United States Patent
Heuft et al.

(12) 
(10) Patent No.: US 6,302,259 B1
(45) Date of Patent: Oct. 16, 2001

(54) METHOD AND APPARATUS FOR ROTATING ROTATIONALLY SYMMETRICAL CONTAINERS, SUCH AS BOTTLES, WHILE TRANSPORTING THEM UNDER BACKUP PRESSURE

(75) Inventors: Bernhard Heuft, Burgbrohl; Hans-Ulrich Goller, Bonn-Bad Godesberg, both of (DE)

(73) Assignee: Heuft Systemtechnik GmbH, Burgbrohl (DE)

(*) Notice: Subject to any disclaimer, the term of this patent is extended or adjusted under 35 U.S.C. 154(b) by 0 days.

(21) Appl. No.: 09/710,034

(22) Filed: Nov. 10, 2000

Related U.S. Application Data

(62) Division of application No. 08/875,393, filed as application No. PCT/EP96/05193 on Nov. 25, 1996, now Pat. No. 6,155,408.

(30) Foreign Application Priority Data

Nov. 24, 1995 (DE) .......................................... 295 18 628 U

(51) Int. Cl.⁷ .................................................... B65G 47/24
(52) U.S. Cl. ...................... 198/416; 198/836.1; 198/456
(58) Field of Search ................................. 198/416, 836.1, 198/836.4, 434, 456, 447, 443, 453, 445, 441

(56) References Cited

U.S. PATENT DOCUMENTS

| | | | |
|---|---|---|---|
| 3,286,814 | * 11/1966 | Atkinson ........................... 198/416 |
| 3,834,516 | * 9/1974 | Reeser ................................. 198/33 |
| 3,983,992 | * 10/1976 | Gray et al. ........................ 198/408 |
| 4,623,059 | * 11/1986 | Agnew .............................. 198/452 |
| 4,832,173 | * 5/1989 | Hattori et al. .................... 198/377 |
| 6,155,408 | * 12/2000 | Heuft et al. .................... 198/836.1 |

FOREIGN PATENT DOCUMENTS

| | | | |
|---|---|---|---|
| 841494 | 9/1976 | (BE) | B65G/67/06 |
| 603 939 | 10/1934 | (DE) . | |
| 843 973 | 7/1952 | (DE) . | |
| 922 517 | 1/1955 | (DE) . | |
| 24 54 041 | 5/1975 | (DE) | G01M/11/00 |
| 31 43 007 A1 | 6/1982 | (DE) | G01N/21/90 |
| 87 02 811 | 8/1987 | (DE) | B65G/47/22 |
| 38 02 463 A1 | 8/1989 | (DE) | G01N/21/90 |
| 34 22 870 C2 | 10/1989 | (DE) | G01N/21/90 |
| 40 10 990 A1 | 10/1991 | (DE) | G01M/19/00 |
| 0 415 154 A1 | 8/1990 | (EP) | B07C/5/34 |
| 2 281 058 A | 2/1995 | (GB) | B65G/33/06 |
| 4-350015 (A) | 12/1992 | (JP) | B65G/47/22 |

* cited by examiner

Primary Examiner—Christopher P. Ellis
Assistant Examiner—Khoi H. Tran
(74) Attorney, Agent, or Firm—Gardner, Carton & Douglas

(57) ABSTRACT

Rotationally symmetrical containers (10) are transported under backup pressure on a conveying surface (12) limited laterally by railings (14). For rotating the containers (10) at a predetermined site along the conveying surface (12), one of two consecutive containers (10) is arranged stable against one railing (14) and the other stable against the other railing (14) in the direction of conveyance after the site at which the containers are to rotate.

16 Claims, 4 Drawing Sheets

METHOD AND APPARATUS FOR ROTATING ROTATIONALLY SYMMETRICAL CONTAINERS, SUCH AS BOTTLES, WHILE TRANSPORTING THEM UNDER BACKUP PRESSURE

This is a Divisional Application of U.S. patent application Ser. No. 08/875,393 filed Jul. 23, 1997 which is a 371 of PCT/EP96/D05193 filed Nov. 25, 1996 now U.S. Pat. No. 6,155,408.

BACKGROUND OF THE INVENTION

The invention relates to a method and apparatus for rotating rotationally symmetrical containers, such as bottles, while transporting them on a conveying surface. The containers are transported under backup pressure and are guided during the transportation, for which the conveying surface has a guide device or a railing on each side.

In particular empty glass or plastic bottles are rotated about their axis for inspecting their side walls. A side wall inspection device is known from EP-A-0 415 154 with which the lateral guide devices consist of belts arranged on both sides of the conveying surface and driven at different speeds so that the empty bottles held between them are rotated about their longitudinal axis. That apparatus requires that the empty bottles have previously been separated or at least guided to the conveying surface free of backup pressure. Therefore, if the empty bottles are not arranged free of pressure, they must be separated.

The invention is based on the problem of enabling the rotation of containers conveyed under backup pressure about their longitudinal axis in a simple manner.

This problem is solved according to the method of the invention in that one of two consecutive containers is arranged offset stable to one side and the other stable to the other side seen in the direction of conveyance after the site at which the containers are to rotate.

The problem is solved within the scope of the apparatus of the invention in that a device is provided for the stable arrangement of one of at least two consecutive containers against the railing and the other container against the other railing in the direction of conveyance after the site at which the containers are to rotate.

Apparatuses are known from DE-C-843 973 and DE-C-922 519 for transporting empty bottles under backup pressure with which empty bottles are alternately offset to the left and to the right railing. However, with those apparatuses, disturbances that lead to a change in the position of a container from one railing to the other railing propagate from the exit end of the conveying device counter to the direction of transportation. Such a change in position then also leads to a reversal of the direction of rotation of the individual empty bottles so that a defined rotation of the empty bottles is not achievable.

According to the basic concept of the present invention, a stable arrangement of at least two containers at the left or, resp., right railing prevents such a disturbance and a change in the position of the individual containers caused by that from taking place after those containers.

All subsequent containers lie stable against one of the two railings and roll along the railing and against each other, the containers rolling alternately along the left and right railing with alternate direction of rotation.

An apparatus for transporting rotationally symmetrical containers is known from U.S. Pat. No. 2,725,138, the containers backing up at the end of the conveying surface and rolling along the side rails. At the end of the conveying surface, the containers are arranged at defined distances on a further transporting device by means of a star wheel. Upon being taken over by the star wheel, each container is pushed laterally against the same railing. Hence, the containers which were previously positioned at the other rail change their position. That change of position causes all subsequent containers likewise to change their position and therewith also their direction of rotation.

The conveying surface can be moving or fixed. Moving conveying surfaces are conveyer belts, chain link conveyers, air cushions, rollers and the like. Fixed conveying surfaces can be simple metal slideways on which the containers are pushed by means of backup pressure, the backup pressure can be produced by a star wheel or a seriesed chain link conveyer. In this context, the term "transporter" encompasses all these kinds of conveying surfaces.

SUMMARY OF THE INVENTION

In a first embodiment of the device for stabilizing the position of at least two consecutive containers, the distance between the two railings in the direction of conveyance is to begin with gradually broadened to about 1.5 times the diameter of the containers and then narrowed down at an angle of the two railings to each other of about 30 to 100°, preferably 50 to 80°, to somewhat more than the diameter of the containers. The path of the railings in this area preferably mirrors or is symmetrical to the midline of the transporter.

The distance between the two railings has an effect on the pressure conditions in the stream of the containers. The following relationships are applicable:

$$\alpha = \arcsin(V/D)$$

$$V = D - d$$

$$F_{1n} = (2 \cdot n - 1) \cdot F_R \cdot \frac{\sin\alpha}{\cos\alpha} = (2 \cdot n - 1) \cdot F_R \cdot \tan\alpha$$

$$F_{2n} = \frac{n \cdot F_R}{\cos\alpha}$$

V=lateral displacement of consecutive containers;
D=distance between the lateral rails (width of the transporter);
d=diameter of the containers;
α=angle between the connecting line of two consecutive containers and the direction of transportation;
$F_{1n}$=the force of the nth container acting on the railing;
$F_{2n}$=the force component acting on the subsequent container
$F_R$=friction force between container and railing.

The apparatus works stable in a broad range of the backup pressure. However, in practice, extreme situations which can lead to disturbances in the rotation behavior of the container result due to most varied influences. Those influences can be allayed by additional measures so that a disturbance of the operation is largely prevented. Very strong pressure at the upstream end of the apparatus can be reduced by a mechanical resistance in the course of the transporter before the apparatus. For example, there can be arranged on the transporter a thin metal sheet over which the containers slide and thereby undergo an additional friction. Baffles which reduce the pressure peaks can also be built up by means of the side railings. The backup pressure is also reduced by the apparatus of the invention itself so that the backup pressure for a subsequent apparatus is reduced by a preceding apparatus. If, vice versa, too low a backup pressure exists, the container can be imparted a force acting in the direction of transportation by a laterally arranged belt running along with it.

By narrowing the distance between the railings at a relatively large angle, it is achieved that in the case that a container at the section of the transporter again narrowed down changes its position from one railing to the other, this does not have any influence on the position of the subsequent container still within the narrowing area. That is to say, the pressure point between the two containers shifts so slightly due to the narrow free movement area of the preceding container that the subsequent container is not forced to change its position to the other railing. The chaotic behavior of the containers is therewith interrupted and a clear and stable arrangement of the containers is attained.

In a second embodiment, the device for stabilizing the position of at least two consecutive containers is a star wheel that is arranged rotatable about a vertical axis adjacent to the transporter and has cutouts on its perimeter of alternately different depth that are distributed to correspond to about the diameter of the containers such that the teeth push every second container against the opposite railing while the intermediate containers rest against the adjacent railing due to the cutouts. Two such star wheels can also be arranged meshing on the left and right adjacent to the transporter, the containers then passing through between the two star wheels.

A stable arrangement of the containers is also possible alternately at the one and the other railing by means of a worm arranged adjacent to the transporter.

The distance between the two railings is normally only slightly, e.g. 1 to 10 mm, greater than the diameter of the containers. For transportation purposes, such a distance between the railings was hitherto viewed to be sufficient, and the containers jumping back and forth from one railing to the other and the associated change of rotational direction during transport was accepted as being unavoidable. This chaotic behavior can be prevented by the invention. In the area in which each container is to have a defined position and rotational direction proceeding from the stabilization device counter to the direction of conveyance, the distance between the railings is there preferably greater than the distance quoted above and is about 1.2 to 1.6 times, preferably 1.4 to 1.5 times, the diameter of the containers.

Within this area with increased distance between the railings on the two sides, the containers alternately rotate in opposite directions about their vertical axis and at the same time each roll alternately along the left and right railings. The stability of the position of the containers is also improved by the friction of the containers against each other being greater than the friction between them and the undersurface, i.e., the transporter, and the railings.

The device according to the invention can be used generally when the containers must rotate when they are handled and inspected.

The apparatus according to the invention can be used for all types of container inspections that require an unrolling of the surface of or a rotation of containers, e.g. to monitor the placement of labels, the mouth or thread, to check the rotational symmetry of the containers, to monitor the side wall, etc., further devices then not being required to rotate the containers. The side walls are there expediently inspected in an area in which the containers (viewed from the side) overlap as little as possible but have already assumed a stable position against one of the two railings. This is generally the area in which the distance between the two railings is about about 1.2 times the bottle diameter.

The apparatus according to the invention can, however, also be used to avoid container noise and wear in the congestion area of transporting devices. The noise and the wear are substantially reduced by the containers rolling against each other and the railings in a controlled manner. When the apparatus according to the invention is used for this purpose over longer distances, it can be expedient to distribute several of the apparatuses over the distance, e.g. at railings that are far apart (about 1.5 times the bottle diameter) which can be provided with a soft surface for additional reduction of noise and wear.

Furthermore, as a result of the controlled surface unrolling of rotationally symmetrical bodies, the apparatus according to the invention can also use be used for printing, coating or applying films, labels or caps to containers. The purposive removal of films, labels or caps is similarly possible with the apparatus according to the invention.

It is further of advantage with the apparatus according to the invention that most of the bottle filling machines used at present require backup pressure at their feed area. Therefore, due to the apparatus according to the invention, not only do the bottles not have to be separated before the side wall inspection device, rather is the device for producing the backup pressure before the filling machine also not needed.

Embodiment examples of the invention are explained in the following with reference to the drawings in which:

DETAILED DESCRIPTION OF THE INVENTION

Figure 1:
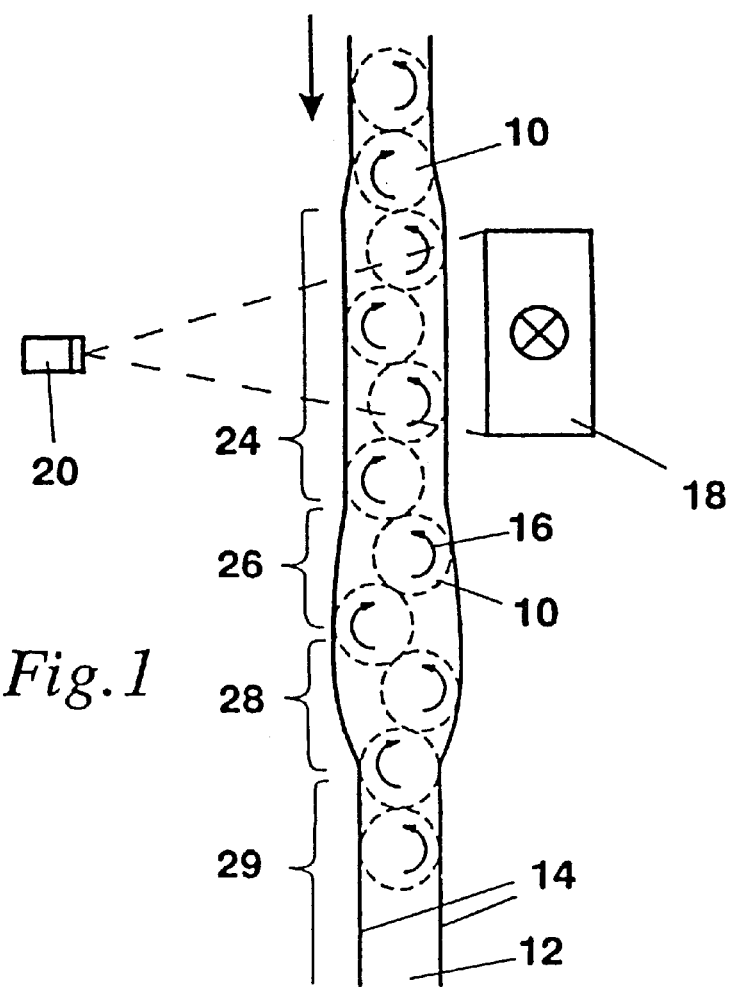
FIG. 1 is a top view of the apparatus for rotating empty bottles in conjunction with a device for side wall inspection.

In accordance with FIG. 1, empty bottles 10 are transported on a transporter 12, e.g. a conveyer belt or a link conveyer, in the direction of the arrow. On each side of the transporter is a fixed railing to hold the empty bottles 10 on the transporter 12 even when there is backup pressure. As indicated by the individual arrows 16, the bottles 10 rotate alternately in opposite direction due to their mutual contact and their contact with the railings 14, the bottles 10 alternately resting against the left and right railings 14.

Figure 2:
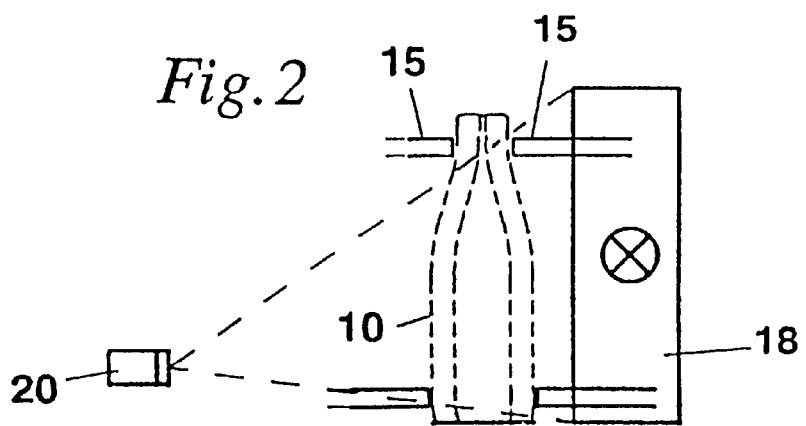
FIG. 2 is a vertical section of the apparatus of FIG. 1 viewed in the direction of the transporter.

An inspection station to inspect the side walls of the bottles 10 is provided that has a radiation source 18 arranged adjacent to the transporter 12 and a detection device 20, e.g. a CCD camera, arranged on the opposite side. Both are constructed and operate in the usual manner and are, therefore, not described in more detail. Within the normal transportation area, the railing 14 is located at about a half the height of the empty bottles 10. In the area of the inspection station, the railing 14 is arranged lower so that the empty bottles 10 are held by the railing 14 at their bottom edges. The empty bottles are guided at the top at their necks by an additional railing 15 (FIG. 2). One of the two railings 14, 15, preferably the lower railing 14, can be provided with a higher friction coating. The empty bottles 10 then slide along the upper railing 15. If the apparatus according to the invention is used in conjunction with an apparatus for inspecting the base of the containers as according to the simultaneously filed PCT application, "Method and apparatus for transporting containers past an apparatus for inspecting the base of the containers" (our reference: 30562/Bodeninspektion), this additional railing 15 can be an extension of the neck guide according to FIG. 2 of this simultaneously filed utility model application. The containers found to be faulty in the base inspection or the side wall inspection can be separated out by an apparatus according to the likewise simultaneously filed PCT application "Apparatus for separating individual or a plurality of rotationally symmetrical containers from a stream of rotationally symmetrical containers conveyed under backup pressure and cylinder having a piston extensible in a controlled manner" (our reference: 30561/Löffel).

When empty bottles are transported under backup pressure on a transporter at substantially unchanging distance between the lateral railings, the position of the bottles is unstable, i.e. the bottles now and then jump chaotically from one railing to the opposite railing or change their rotational direction. It is achieved by the apparatus according to the invention that the individual bottles 10 rest stably against one of the two railings 14 within a certain area and retain their rotational direction. The distance between the two railings 14 at the exit of the apparatus is there somewhat more than the diameter of the bottles 10, as is customary for transporting under backup pressure. This distance is then increased to 1.2 to 1.3 times the diameter of the bottles 10 within a length corresponding to about the diameter of the bottles 10. This increased distance is then maintained within a first area 24 whose length depends on the circumstances involved. It is sufficient for a side wall inspection when the length of this first area 24 corresponds to about 4 times the bottle diameter. In the following second area 26, the distance between the railings 14 gradually increases, i.e. within a length corresponding to about 2 to 3 times the bottle diameter, to 1.5 times the bottle diameter and then reduces within a substantially shorter third area 28, whose length corresponds to about 1.5 times the bottle diameter, to the initial length of somewhat more than the bottle diameter.

Disturbances in the position of the bottles 10 generally arise at the exit end of a transporter, e.g. by removing a bottle, and then propagate counter to the direction of conveyance. If the last bottle changes its position from left to right, the pressure point changes with respect to the last bottle but one so that it jumps from right to left and this change in position then propagates counter to the direction of conveyance over the entire length of the transporter. Since the bottles at the exit end of the third area 28 are very markedly offset from each other, and in particular the last bottle 11 within the third area 28 is offset relatively far to the side of the following bottle 10 that is in the again narrow area 29 subsequent thereto, the pressure point between these two bottles does not change so markedly when the bottle in the narrow area 29 changes its position that the last bottle in the third area 28 changes its position toward the other railing 14.

Figure 5:
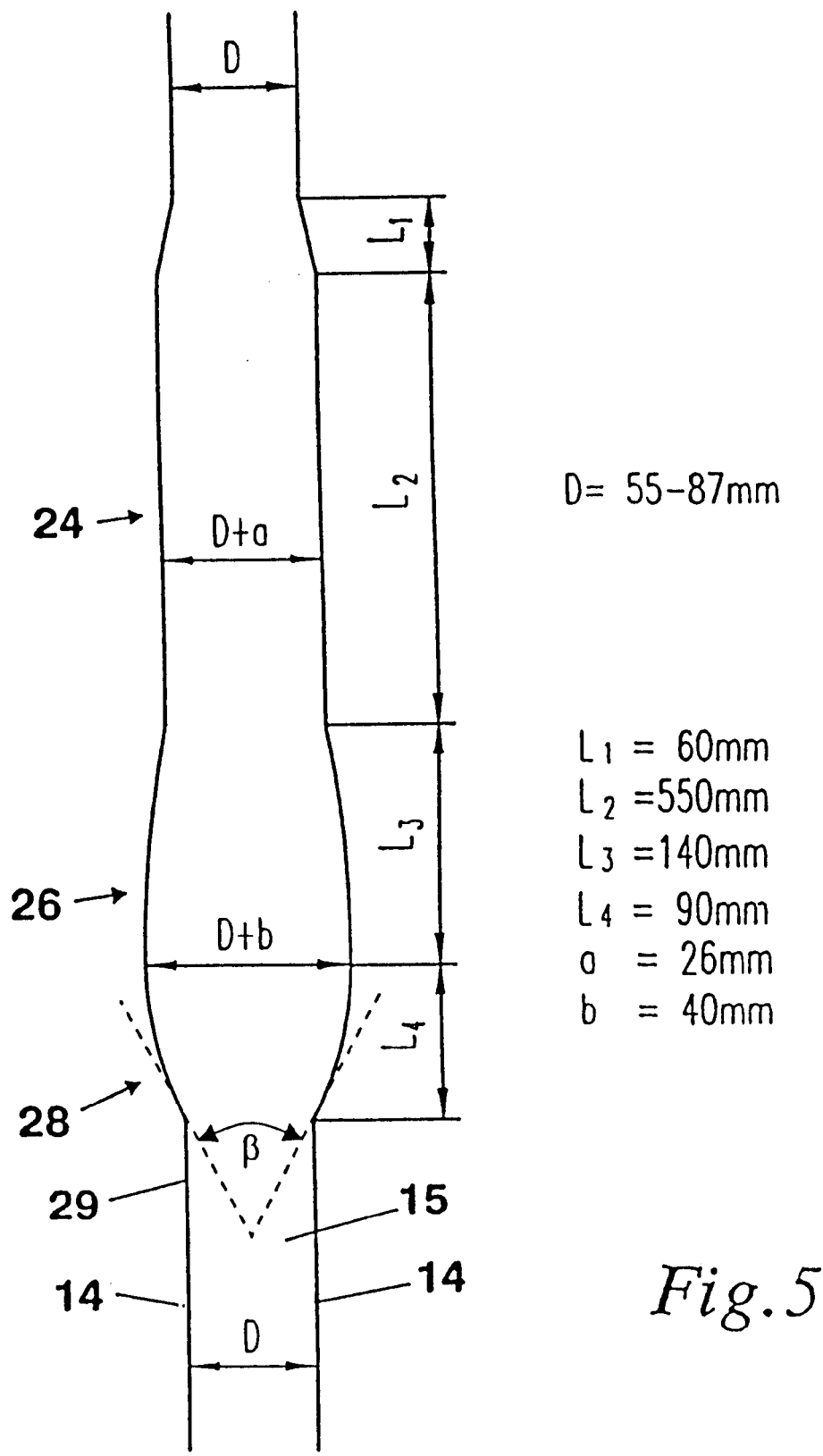

In FIG. 5, the course of the railings 14 is shown for a transporter 12 with which bottles are transported whose diameter D ranges from 55 to 87 mm. $L_2$ is the length of the first area 24, $L_3$ that of the second area 26 and $L_4$ that of the third area 28. The lateral distance between the railings at the inlet and outlet (area 29) is a few millimeters greater than the bottle diameter D.

FIG. 2 shows a section of the device for side wall inspection viewed counter to the direction of transportation. The side wall inspection is arranged in the first area 24 because the distance between the railings 14 is there only about 1.2 to 1.3 times the bottle diameter so that the bottles 10 overlap only slightly viewed from the side. The field of vision of the camera is selected such that several bottles 10 are comprised simultaneously and a complete unrolling of the side wall of each bottle within the field of vision of the camera results due to the rotation of each bottle. Each point on the surface of the bottle can therewith be examined at least once.

Figure 3:
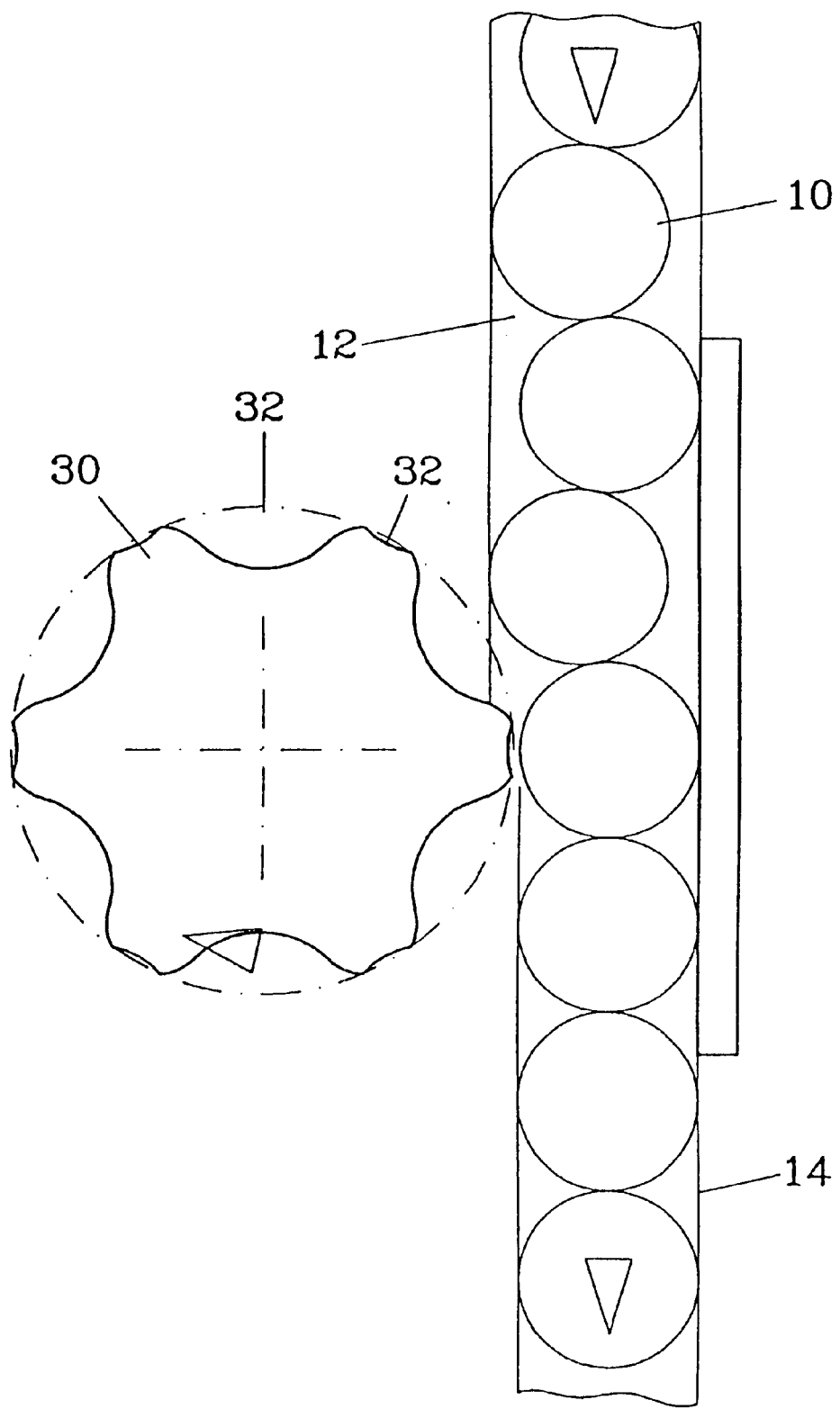
FIG. 3 is a top view of another embodiment example of the apparatus for rotating containers.

FIG. 3 shows an embodiment example with which the device for stabilizing the position and rotational direction of the containers 10 is formed by a star wheel 30 arranged adjacent to the transporter 12 and rotatable about a vertical axis. The star wheel 30 is divided into sections equal to about the diameter of the containers 10 and has cutouts 32 of alternately different depth. Due to this design, the star wheel 30 presses each second container 10 against the opposite railing so that the intermediate containers 10 necessarily rest against the railing 14 close to the rotary axis of the star wheel 30. Due to this obligatory positioning of the containers 10 by the star wheel 30, a disturbance cannot propagate counter to the direction of transportation beyond the star wheel 30. Each container 10 can also be held between two star wheels 30.

Figure 4:
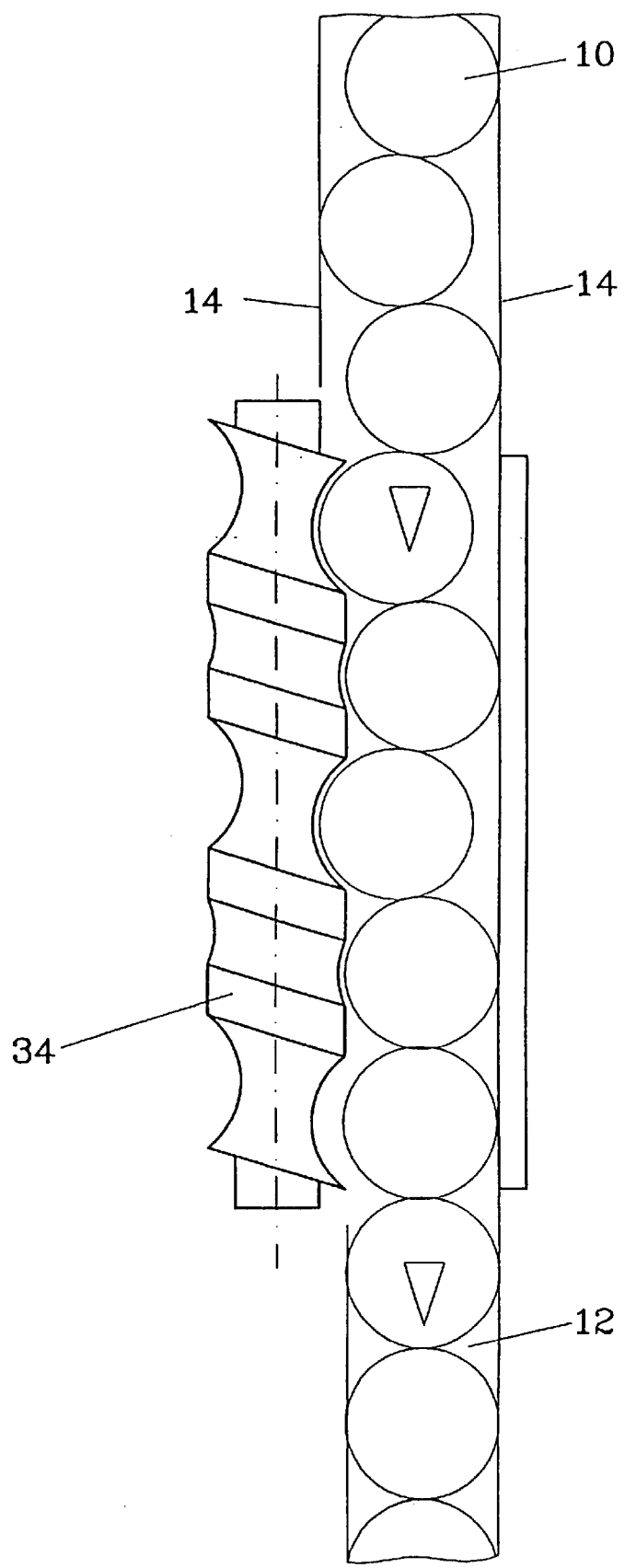
FIG. 4 a further embodiment example of the apparatus for rotating containers and FIG. 5 the course of the railing for bottles with a diameter of 55–87 mm.

FIG. 4 shows a similar embodiment example, the device for stabilizing the position and rotational direction of the containers 10 is a worm 34 arranged adjacent to the transporter 12 and having an approximately horizontal rotary axis. The worm has threads with alternately different depth so that each second container 10 is pushed against the opposite railing. In this case, too, it is in turn possible to arrange a worm 34 at both sides of the transporter 12.

What is claimed is:

1. A method for rotating rotationally symmetrical containers along a conveying surface comprising the steps of:
   a. limiting the conveying surface laterally by at least two railings, the distance between the railings in a first area being limited to at least 1.2 to 1.6 times the diameter of the container;
   b. transporting the containers under back pressure; and
   c. arranging one of two consecutive containers stable against one of the at least two railings and the other stable against the other of the at least two railings in the direction of conveyance after the first area by means of at least one worm arranged adjacent to the conveying surface, thereby rotating the containers.

2. The method of claim 1 wherein the distance between the at least two railings in the first area is limited to between about 1.4 to 1.5 times the diameter of the container.

3. The method of claim 1 wherein the at least two railings are disposed on opposite sides of the conveying surface.

4. The method of claim 1 wherein the at least one worm is arranged at one side of the conveying surface.

5. The method of claim 1 wherein the at least one worm is freely rotatable about a horizontal axis.

6. The method of claim 1 wherein at least one worm is arranged on opposite sides of the conveying surface.

7. The method of claim 1 wherein the at least worm has threads with alternately different depth.

8. The method of claim 2 wherein the threads with lesser depth press each second container against the railing at the opposite side of the conveying surface.

9. An apparatus for rotating rotationally symmetrical containers comprising:

a. a conveying surface where the containers are to rotate;
b. at least two railings limited the conveying surface laterally, the distance between the railings in a first area being limited to at least 1.2 to 1.6 times the diameter of the container;
c. means for transporting the containers under backup pressure; and
d. at least one worm for the stable arrangement of at least one of two consecutive containers at one of the at least two railings and of the other container at the other of the at least two railings, said at least one worm being disposed in the direction of conveyance after the first area and adjacent to the conveying surface.

10. The apparatus of claim 9 wherein the distance between the at least two railings in the first area is limited to between about 1.4 to 1.5 times the diameter of the container.

11. The apparatus of claim 9 wherein the at least two railings are disposed on opposite sides of the conveying surface.

12. The apparatus of claim 9 wherein the at least one worm is arranged at one side of the conveying surface.

13. The apparatus of claim 9 wherein the at least one worm is freely rotatable about a horizontal axis.

14. The apparatus of claim, 9 herein at least one worm is arranged on opposite sides of the conveying surface.

15. The apparatus of claim 9 herein the at least one worm has threads with alternately different depth.

16. The apparatus of claim 12 wherein the at least one worm wherein the threads with lesser presses every second container against the railing at the opposite side of the conveying surface.

* * * * *